United States Patent
Heath

(10) Patent No.: US 10,858,180 B2
(45) Date of Patent: *Dec. 8, 2020

(54) SYSTEMS AND METHODS FOR CONTROLLING AN ENVIRONMENT WITHIN A VOLUME

(71) Applicant: THE BOEING COMPANY, Chicago, IL (US)

(72) Inventor: Jonathan Christopher Heath, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 289 days.

This patent is subject to a terminal disclaimer.

(21) Appl. No.: 15/938,064

(22) Filed: Mar. 28, 2018

(65) Prior Publication Data

US 2018/0215535 A1 Aug. 2, 2018

Related U.S. Application Data

(63) Continuation of application No. 14/223,749, filed on Mar. 24, 2014, now Pat. No. 9,969,549.

(51) Int. Cl.
*B65D 90/34* (2006.01)
*B64D 37/00* (2006.01)
*B64F 5/60* (2017.01)
*B64F 5/45* (2017.01)

(52) U.S. Cl.
CPC .......... *B65D 90/34* (2013.01); *B64D 37/005* (2013.01); *B64F 5/45* (2017.01); *B64F 5/60* (2017.01)

(58) Field of Classification Search
CPC combination set(s) only.
See application file for complete search history.

(56) References Cited

U.S. PATENT DOCUMENTS

| | | | |
|---|---|---|---|
| 4,262,492 A | 4/1981 | Morita et al. |
| 4,441,901 A | 4/1984 | Endoh |
| 5,779,538 A | 7/1998 | Jardinier |
| 2004/0175505 A1 | 9/2004 | Faure et al. |
| 2005/0247197 A1 | 11/2005 | Snow, Jr. et al. |
| 2008/0027683 A1 | 1/2008 | Middleton et al. |
| 2008/0139869 A1 | 6/2008 | Wilson et al. |
| 2010/0163634 A1 | 7/2010 | Klein et al. |
| 2011/0029413 A1 | 2/2011 | Ben-Tzur et al. |

(Continued)

FOREIGN PATENT DOCUMENTS

| | | |
|---|---|---|
| CA | 2749866 A1 | 7/2010 |
| EP | 0278755 A2 | 8/1988 |

(Continued)

OTHER PUBLICATIONS

JP Office Action regarding Application No. 2015-029326 dated Jan. 4, 2019 with English Translation; pp. 1-9.

(Continued)

*Primary Examiner* — Stephen D Meier
*Assistant Examiner* — Nasir U. Ahmed
(74) *Attorney, Agent, or Firm* — Armstrong Teasdale LLP

(57) ABSTRACT

A system for controlling an environment within a fuel tank is provided. The system includes a conduit with a plurality of vents, wherein the conduit defines a path through the fuel tank, and wherein the conduit is configured to direct a flow of air along the path and out the plurality of vents.

23 Claims, 7 Drawing Sheets

(56) References Cited

U.S. PATENT DOCUMENTS

| | | | |
|---|---|---|---|
| 2011/0315818 A1 | 12/2011 | Chao et al. | |
| 2011/0316299 A1* | 12/2011 | Mccoubrey | B60P 3/14 296/24.32 |
| 2012/0071082 A1* | 3/2012 | Karamanos | F24F 5/0003 454/284 |
| 2016/0281348 A9 | 9/2016 | Karamanos et al. | |

FOREIGN PATENT DOCUMENTS

| | | |
|---|---|---|
| JP | H06344366 A | 12/1994 |
| JP | 2000343609 A | 12/2000 |
| JP | 2007127338 A | 5/2007 |
| JP | 2007326048 A | 12/2007 |
| JP | 2008500898 A | 1/2008 |
| WO | 2005118124 A1 | 12/2005 |
| WO | 2005123145 A3 | 6/2006 |
| WO | 2009095919 A2 | 8/2009 |
| WO | 2010039313 A3 | 2/2011 |

OTHER PUBLICATIONS

Canadian Office Action for Application No. 2882473, dated Jan. 27, 2016, 3 pages.
CN Office Action for related application 201510107620.X dated Mar. 30, 2018; 11 pp.

\* cited by examiner

SYSTEMS AND METHODS FOR CONTROLLING AN ENVIRONMENT WITHIN A VOLUME

PRIORITY

This Application is a Continuation of U.S. patent application Ser. No. 14/223,749 filed on Mar. 24, 2014, titled "Systems and Methods for Controlling a Fuel Tank Environment," now issued U.S. Pat. No. 9,969,549, the contents of which are hereby incorporated by reference herein in their entirety.

BACKGROUND OF THE INVENTION

The subject matter described herein generally relates to controlling an environment of a fuel tank and, more particularly, to systems and methods for curing a sealant within a fuel tank of an aircraft.

During an assembly of a fuel tank of an aircraft, a sealant is applied within an interior of the fuel tank to seal the fuel tank and keep it from leaking. After a sealant is applied, the sealant must be cured before the assembly of the fuel tank is complete. Two of the main factors that affect the curing process are temperature and relative humidity (RH) within the fuel tank. Generally speaking, as the temperature and/or RH increase, the time it takes to cure a sealant decreases. As a result, curing times of a sealant may vary based on time of year and/or factory environment. For example, during summer, a sealant may take up to 10% longer than normal to cure due to low RH and uneven air distribution. During winter, a sealant may take up to twice as long to cure due to low temperatures, low RH, and uneven air distribution.

However, while the sealant is curing within the fuel tank, mechanics may be required to work for extended periods of time inside the fuel tank. Thus, for the safety of the mechanics working therein, the environment of the fuel tank must be monitored such that the temperature and/or RH are maintained at acceptable levels. For example, if the temperature within the fuel tank exceeds 79° F., the mechanics are required to exit the fuel tank for safety purposes. Thus, while the sealant may cure more quickly as the temperature increases, the mechanics are unable to continue working in an environment that is above 79° F.

Further, chemicals such as isopropanol (IPA) and methyl propyl ketone (MPK) used during the assembly of a fuel tank require the fuel tank to be heavily ventilated in order to create an environment inside the fuel tank that is suitable/safe for mechanics working therein. However, current systems and methods of ventilating a fuel tank create large variances in temperature, RH levels, and air circulation throughout the fuel tank. As a result, curing times of a sealant are non-uniform throughout the fuel tank and dead spots created by poor circulation enable a pooling effect of volatile organic compounds (VOCs). This not only creates discomfort for the mechanics working within the fuel tank, but can lead to such a dangerous environment that prohibits the mechanics to work within the fuel tank.

Therefore, there is a need in the field of curing sealants within fuel tanks for a system and method that control an environment of a fuel tank such that a curing time of a sealant, a mechanics discomfort, VOC pooling, and variances between temperature/RH levels throughout the fuel tank are reduced.

BRIEF DESCRIPTION OF THE INVENTION

In one aspect, a system for controlling an environment within a fuel tank is provided. The system includes a conduit with a plurality of vents, wherein the conduit defines a path through the fuel tank, and wherein the conduit is configured to direct a flow of air along the path and out the plurality of vents.

In another aspect, a method for controlling an environment within a fuel tank is provided. The method includes receiving a current measure of a temperature and/or a relative humidity within the fuel tank, and increasing or decreasing one or more of a temperature of a flow of air and a humidity within the flow of air directed through a plurality of vents along a conduit that defines a path through the fuel tank.

In yet another aspect, one or more non-transitory computer readable media comprising instructions for controlling an environment within a fuel tank is provided. The instructions cause a processor to perform the steps of receiving a current measure of a temperature and/or a relative humidity within the fuel tank, and increasing or decreasing one or more of a temperature of a flow of air and a humidity within the flow of air directed through a plurality of vents along a conduit that defines a path through the fuel tank.

DETAILED DESCRIPTION OF THE INVENTION

While embodiments of the disclosure are illustrated and described herein with reference to controlling an environment within a fuel tank, and more specifically, to systems and methods for curing a sealant within a fuel tank of an aircraft, aspects of the disclosure are operable with any system that performs the functionality illustrated and described herein, or its equivalent.

Figure 1:
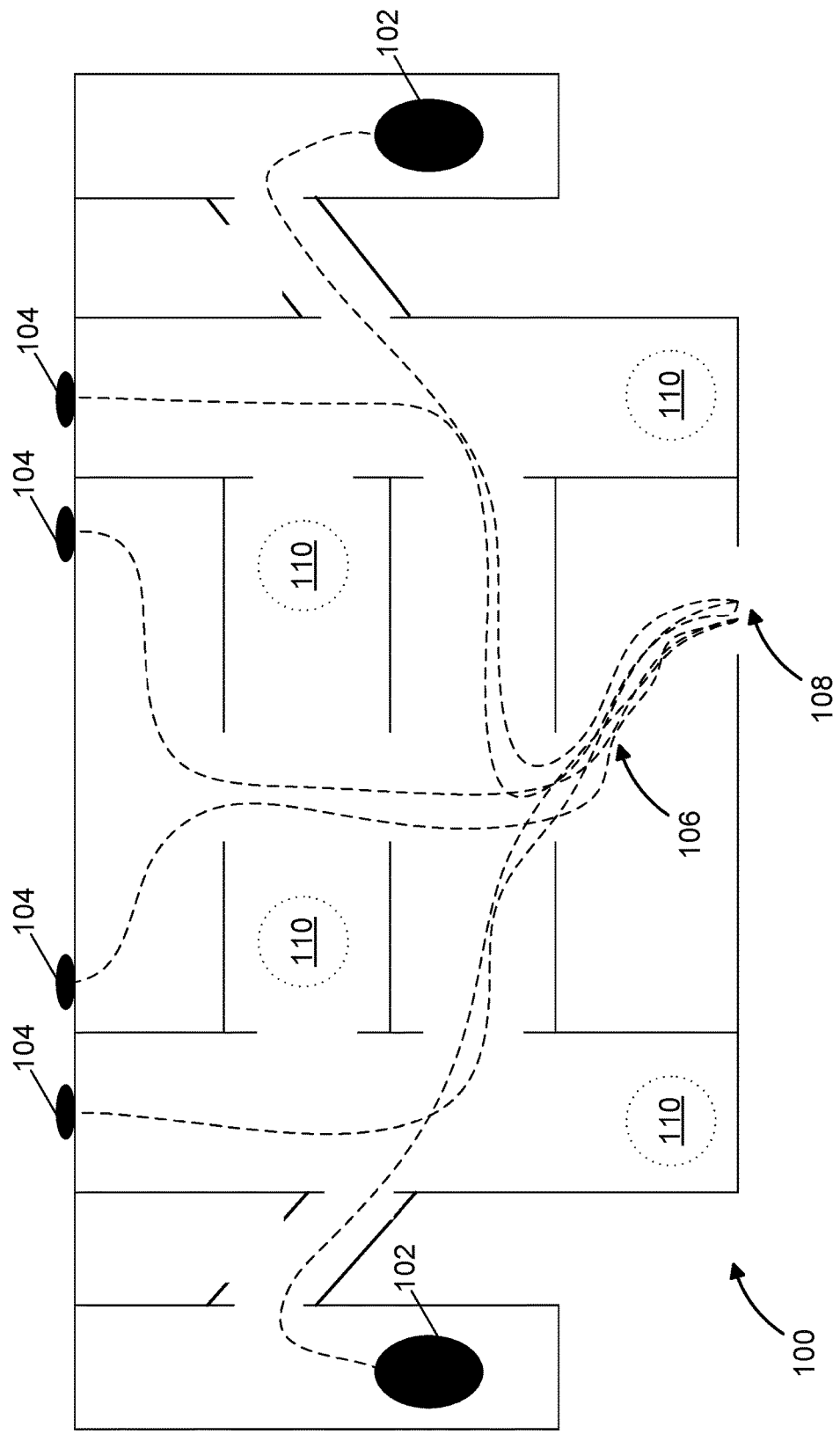
FIG. 1 is an illustrative example of a path of an airflow through a fuel tank using known ventilation systems and methods.

With reference to FIG. 1, current systems and methods for venting a fuel tank 100 utilize two 10" ducts 102 located in an outboard section of fuel tank 100 and four 4" ducts 104 located in a forward section of fuel tank 100. This enables "new air" to be blown into fuel tank 100 while "old air" is being pushed out of ducts 102 and 104. During the assembly of fuel tank 100, a sealant (not shown) is applied within an interior of fuel tank 100 in order to keep fuel tank 100 from leaking. However, in order to enable the sealant to cure properly, the temperature and relative humidity (RH) within fuel tank 100 must be controlled. For example, a sealant such as an A2 type sealant or a B2 type sealant require an environment of 77° F. and 50% RH to enable curing within 72 hours and 24 hours, respectively. However, due to high velocities (e.g., 5,000 fps) of an airflow 106 entering fuel tank 100 at opening 108, along with static/fixed temperatures of airflow 106, static/fixed RH of airflow 106, and a design of fuel tank 100, hot spots (e.g., 85° F. at 108 in FIG. 1) and cold spots (e.g., 65° F. at 110 in FIG. 1) develop throughout fuel tank 100. This not only affects a curing of the sealant and a comfort level for the mechanics working within fuel tank 100, but also causes a pooling effect of volatile organic compounds (VOCs) which forms dead spots 110 (e.g., areas created as a result of poor circulation as airflow 106 takes the path of least resistance), creating a potentially dangerous environment.

Figure 2:
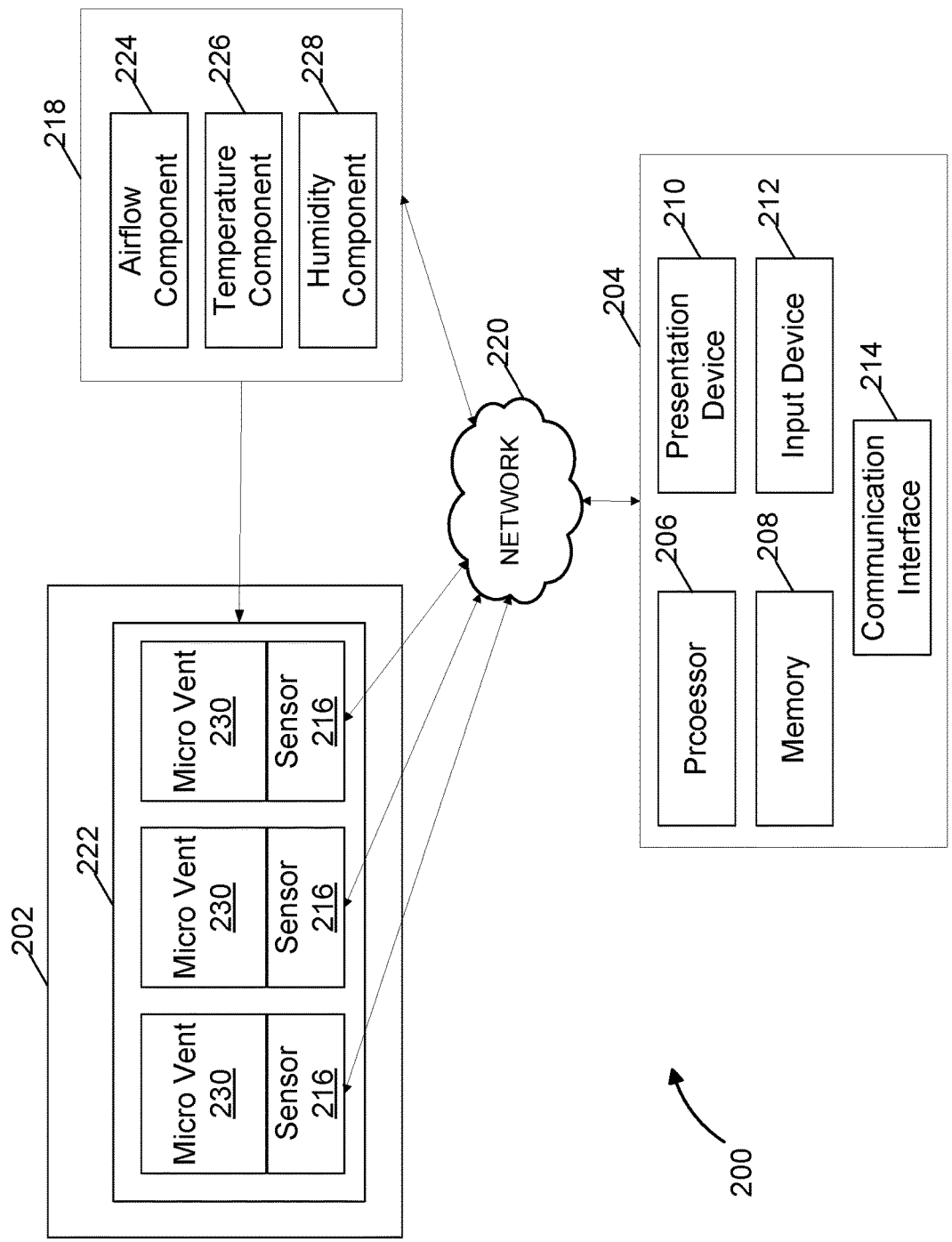
FIG. 2 is a block diagram illustrating an exemplary system for use in controlling an environment of a fuel tank.

With reference now to FIG. 2, a block diagram illustrating an exemplary system 200 for use in controlling an environment of a fuel tank 202 in accordance with the embodiments of the present disclosure will now be described. While system 200 is described herein as being associated with fuel tank 202 of an aircraft, system 200 is applicable with numerous other environments and/or configurations, such as a sewage management system and fuel tanks of marine vessels.

System 200 includes a computing device (e.g., controller) 204, a processor 206 for executing instructions, and a memory device 208. Computing device 204 may operate in a networked environment using logical connections to one or more remote computers. Although described in connection with an exemplary computing system environment, embodiments of the present disclosure are operational with numerous other general purpose or special purpose computing system environments or configurations. Examples of well-known computing systems, environments, and/or configurations that may be suitable for use with aspects of the present disclosure include, but are not limited to, personal computers, server computers, hand-held or laptop devices, multiprocessor systems, microprocessor-based systems, programmable consumer electronics, mobile telephones, network PCs, minicomputers, mainframe computers, distributed computing environments that include any of the above systems or devices, and the like.

Processor 206 may include a processing unit, such as, without limitation, an integrated circuit (IC), an application specific integrated circuit (ASIC), a microcomputer, a programmable logic controller (PLC), and/or any other programmable circuit. Processor 206 may include multiple processing units (e.g., in a multi-core configuration). Computing device 204 is configurable to perform the operations/processes (e.g., process 300 described below) described herein by programming processor 206 with appropriate instructions. For example, processor 206 may be programmed by encoding an operation as one or more executable instructions and providing the executable instructions to processor 206 in memory device 208 that is coupled to processor 206.

In some embodiments, executable instructions are stored in memory device 208. Memory device 208 is any device allowing information, such as executable instructions and/or other data, to be stored and retrieved. For example, memory device 208 may store computer readable instructions for determining one or more of the following: temperature levels, humidity levels, and a level of velocity for a flow of air. In addition, memory device 208 may be configured to store historic fuel tank environment data, such as temperature and RH data from defined locations within a plurality of fuel tanks and/or any other data suitable for use with the methods described herein. In one embodiment, processor 206 and memory device 208 may be remote from computing device 204. In another embodiment, the data and the computer-executable instructions may be stored in a cloud service, a database, or other memory area accessible by computing device 204. Such embodiments reduce the computational and storage burden on computing device 204.

In some embodiments, computing device 204 includes at least one presentation device 210 for presenting information to a user. Presentation device 210 is any component capable of conveying information to a user. Presentation device 210 may include, without limitation, a display device (e.g., a liquid crystal display (LCD), organic light emitting diode (OLED) display, or "electronic ink" display) and/or an audio output device (e.g., a speaker or headphones). In some embodiments, presentation device 210 includes an output adapter, such as a video adapter and/or an audio adapter. An output adapter is operatively coupled to processor 206 and configured to be operatively coupled to an output device, such as a display device or an audio output device.

In some embodiments, computing device 204 includes an input device 212 for receiving input from a user. Input device 212 may include, for example, a keyboard, a pointing device, a mouse, a stylus, a touch sensitive panel (e.g., a touch pad or a touch screen), a position detector, and/or an audio input device. A single component, such as a touch screen, may function as both an output device of presentation device 210 and input device 212. Computing device 204 also includes a communication interface 214, which is configured to be communicatively coupled to sensors 216 and airflow system 218 via, for example, network 220. Network 220 may include, without limitation, the Internet, a local area network (LAN), a wide area network (WAN), a wireless LAN (WLAN), a mesh network, and/or a virtual private network (VPN).

Sensors 216 provide computing device 204 with readings of one or more of the following: temperature, RH, and wind/air velocities within fuel tank 202 throughout fuel tank 202. Sensors 216 may provide these readings/information in real time, periodically (e.g., every minute, every five minutes, or every hour), or upon request. A computing device 204 utilizes the information received from sensors 202 to adjust a temperature level of an airflow, a humidity level of the airflow, an amount of air in the airflow, and a velocity of the airflow provided by a conduit 222 coupled to airflow system 216. Further, computing device 204 may adjust an amount/velocity of the airflow, a temperature of the airflow, or a humidity level of the airflow based on an identified time (e.g., a desired time) to cure a sealant and/or a rate at which air within fuel tank 202 is being pulled out of fuel tank 202 through one or more vents on an exterior wall of the fuel tank. In one embodiment, a plurality of conduits 222 are provided within fuel tank 202. More specifically, a manifold (not shown) may connect a plurality of conduits 222 such that each bay/portion of fuel tank 202 may have a separate conduit 222. In one embodiment, conduit 222 is made from, for example, plastic, rubber, or other flexible type of tubing material that may prevent chafing and/or increase portability. Conduit 222 includes a plurality of micro vents 230 that enable the airflow to be directed into fuel tank 202 by a path created by conduit 222. In one embodiment, micro vents 230 are made from, for example, plastic. Further, micro vents 230 may have the ability to adjust for calibration or fine tuning of system 200. In addition, sensors 202 may be placed on an exterior or an interior of micro vents 230 to measure the temperature, the RH, and/or velocity of the airflow as it exits micro vents 230 or air ducts located on an exterior wall of fuel tank 202.

To enable computing device 204 to adjust a temperature level of the airflow, a humidity level of the airflow, an amount of air in the airflow, and a velocity of the airflow, airflow system 218 includes an airflow component 224, a temperature component 226, and/or humidity component 228. For example, airflow component includes a combination of air handlers and blowers to create defined amounts of air/velocity as needed. Further, temperature component (such as a thermocouple) may be used to heat or cool the air in the airflow. In addition, humidity component 228 provides water/moister to the airflow such that a defined RH level can be achieved within the airflow and therefore within fuel tank 202.

Figure 3:
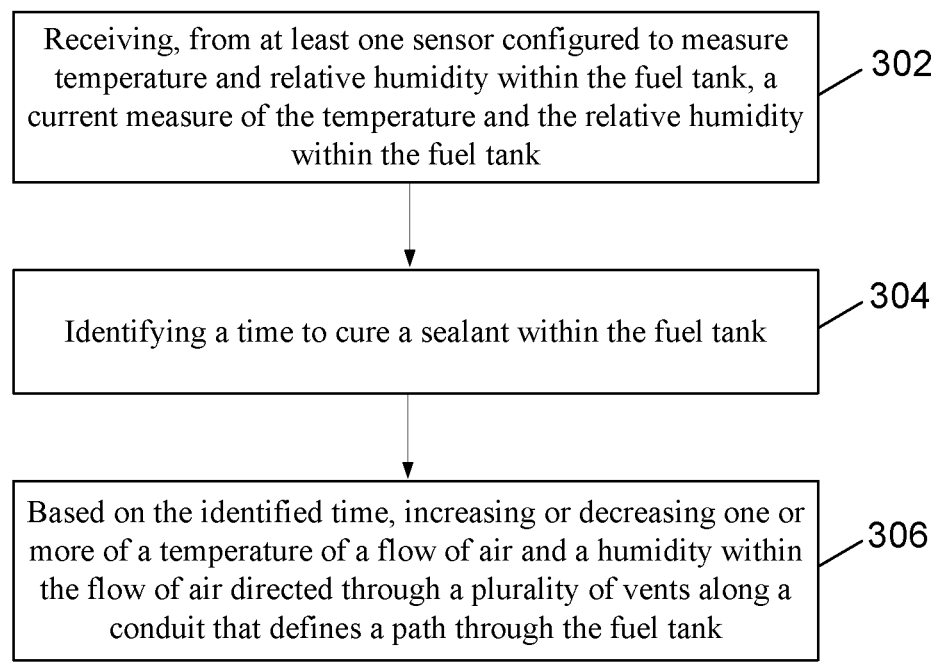
FIG. 3 is a flow diagram depicting a method of controlling an environment of a fuel tank.
Figure 4:
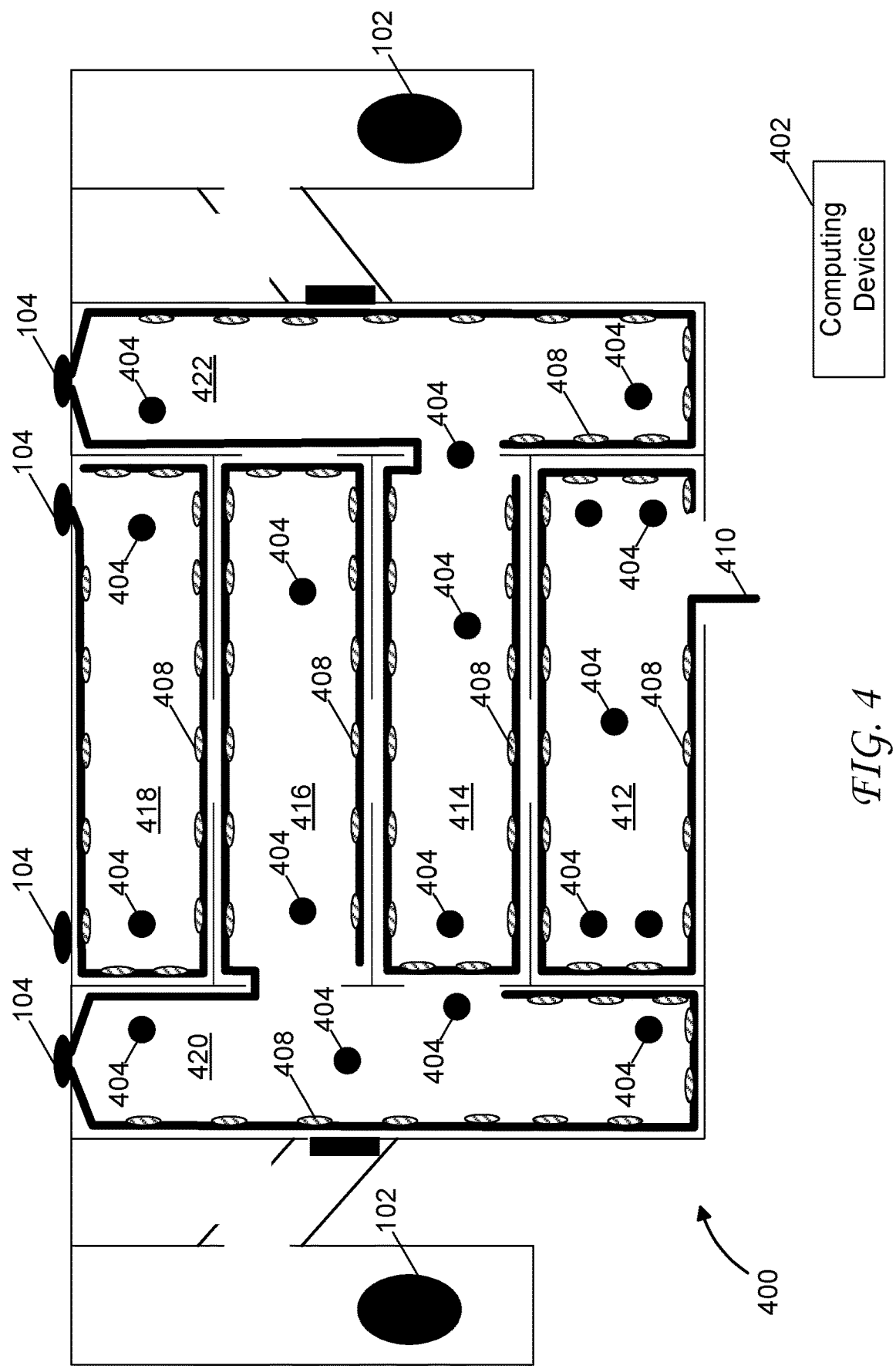
FIG. 4 is an illustrative example of a fuel tank using ventilation systems and methods described herein.

With reference now to FIGS. 3 and 4, a method 300 for curing a sealant within a fuel tank 400 of an aircraft is provided. While method 300 is described herein as being performed within fuel tank 400 of an aircraft, method 300 is applicable with numerous other environments and/or configurations, such as a sewage management system and fuel tanks of marine vessels.

Method 300 begins at 302 whereby computing device 402 receives, from at least one sensor 404 configured to measure temperature and relative humidity within fuel tank 400, a current measure of a temperature and/or a RH within fuel tank 400. In one embodiment, each sensor 404 can measure both temperature and RH, or in another embodiment, a first sensor 404 measures temperature and a second sensor 404 measures RH. In addition, each sensor 404 may be placed throughout an interior of fuel tank 400 in order to measure temperature and RH at defined locations within fuel tank 400. At 304, computing device 402 identifies a time to cure a sealant within fuel tank 400. For example, a user may select a time allotted in an assembly of fuel tank 400 for curing the sealant. As such, a user may provide computing device 402 with a time for curing and as a result, computing device 402 establishes an environment (e.g., a temperature and RH) needed to achieve curing during the selected time. In one embodiment, instead of providing a time, the temperature and RH levels may be provided to computing device 402.

At 306, computing device 402 increases or decreases one or more of a temperature of an airflow and a humidity level within the airflow that is directed through a plurality of vents 408 along a conduit 410 that defines a path through fuel tank 400. For example, as temperature readings are provided by sensor 402, computing device 402 may increase a temperature of the airflow if a temperature within fuel tank 400 is below a temperature threshold level, or computing device 402 may decrease a temperature of the airflow if a temperature within fuel tank 400 is above a temperature threshold level. Further, as RH readings are provided by sensor 402, computing device 402 may increase a moisture level within the airflow if a RH level within fuel tank 400 is below a RH threshold level, or computing device 402 may decrease a moister level of the airflow if a RH level within fuel tank 400 is above a RH threshold level.

In one embodiment, a current level of VOCs within fuel tank 400 is also received by computing device 402 from sensor 402. For example, computing device 402 may increase a velocity of the airflow when the current level of the VOCs exceeds a VOC threshold level in a particular area of fuel tank 400. By increasing the velocity of the airflow, VOCs can be purged from the system or reduced below the VOC threshold level. In one embodiment, the VOC threshold level is based on a chemical being measured. Further, the VOC may be a percentage (e.g., 10%) of an exposure limit of a particular chemical set by, for example, the Occupational Health and Safety Administration (OSHA). In another embodiment, the VOC threshold is about 20 ppm.

In addition, computing device 402 may trigger an alarm that provides a notification that a level of VOCs within fuel tank 400 has exceeded the VOC threshold level, which notifies a user that the environment within fuel tank 400 is unsafe.

In another embodiment, since mechanics work for extended periods of time inside fuel tank 400 during an assembly of fuel tank 400, computing device 402 identifies a number of humans (e.g., mechanics) within fuel tank 400 in order to create a safe/suitable environment for the mechanics working therein. For example, since chemicals such as isopropanol (IPA) and methyl propyl ketone (MPK) are used during the assembly, enabling mechanics to continue work within fuel tank 400 involves heavily ventilating fuel tank 400 in order to create an environment that is safe/suitable for the mechanics. Further, to lower a tact time for curing a sealant, a temperature and/or RH within fuel tank 400 may be increased. Thus, to enable the temperature and RH to increase while still maintaining a comfortable/safe environment for mechanics within fuel tank 400, vents 400 may be strategically placed such that the airflow is blowing on each mechanic, which lowers a perceived temperature and allows for elevated baseline temperatures that aid in the curing process. Thus, in one embodiment, computing device 402 increases a velocity of the airflow and/or decreases a temperature of the airflow based on a number of humans/mechanics that are or will be within fuel tank 400 to enable a perceived temperature or an actual temperature within fuel tank 400 to be at or below a safe temperature threshold level, for example, at or below 79° F. In addition, computing device 402 takes into consideration body heat given off by each of the mechanics within fuel tank 400. As such, a temperature and RH within fuel tank 400 is dynamically adjusted in real time in order to account for the excess heat from, for example, body heat, based on a number of mechanics within fuel tank 400.

In one embodiment, if it is determined that a human is not within fuel tank 400, computing device 402 may increase a temperature within fuel tank 400 to a maximum temperature threshold (e.g., a temperature that optimizes curing, such as from about 140° F. to about 250° F.) and increase an RH within fuel tank 400 to a maximum RH threshold (e.g., a RH that optimizes curing, such as from about 70% RH to about 90% RH). As described in further detail below with respect to FIGS. 5-7, elevating the temperature and the RH, a curing process of a sealant can be cut at least in half, for example, from 72 hours to 36 hours.

In another embodiment, fuel tank 400 includes a plurality of bays, for example, bay 412, bay 414, bay 416, bay 418, bay 420, and bay 422. Thus, each bay may be considered to have its own environment separate from other bays. As such, access to each bay may be sealed off from other bays during the assembly process using, for example, bulkhead covers. Thus, if bay 418 does not have a mechanic working therein, computing device 402 may increase a temperature within bay 418 to a maximum temperature threshold and increase an RH within bay 418 to a maximum RH threshold, while maintaining an environment within bays 412, 414, 416, 420, and 422 at safe/comfortable level for a mechanic to work therein.

In one embodiment, prior to providing conduit 410 within fuel tank 400, historic data may be accessed, analyzed, and/or provided to a virtual simulation that emulates method 300 being applied within fuel tank 400. Historic fuel tank environment data includes historic temperature levels, historic RH levels, historic VOC levels, and historic airflow velocity levels at defined locations within a plurality of fuel tanks. The collection of this data along with the virtual simulation provides an ability to optimize a placement of conduit 410 and vents 408 throughout fuel tank 400 as areas of most concern or that have been problematic in the past may be addressed by the dynamic placement of conduit 410. Further, a temperature level of the airflow, an RH level of the airflow, and/or a velocity level of the airflow may also be optimized based on the historic data/virtual simulation.

Figure 5:
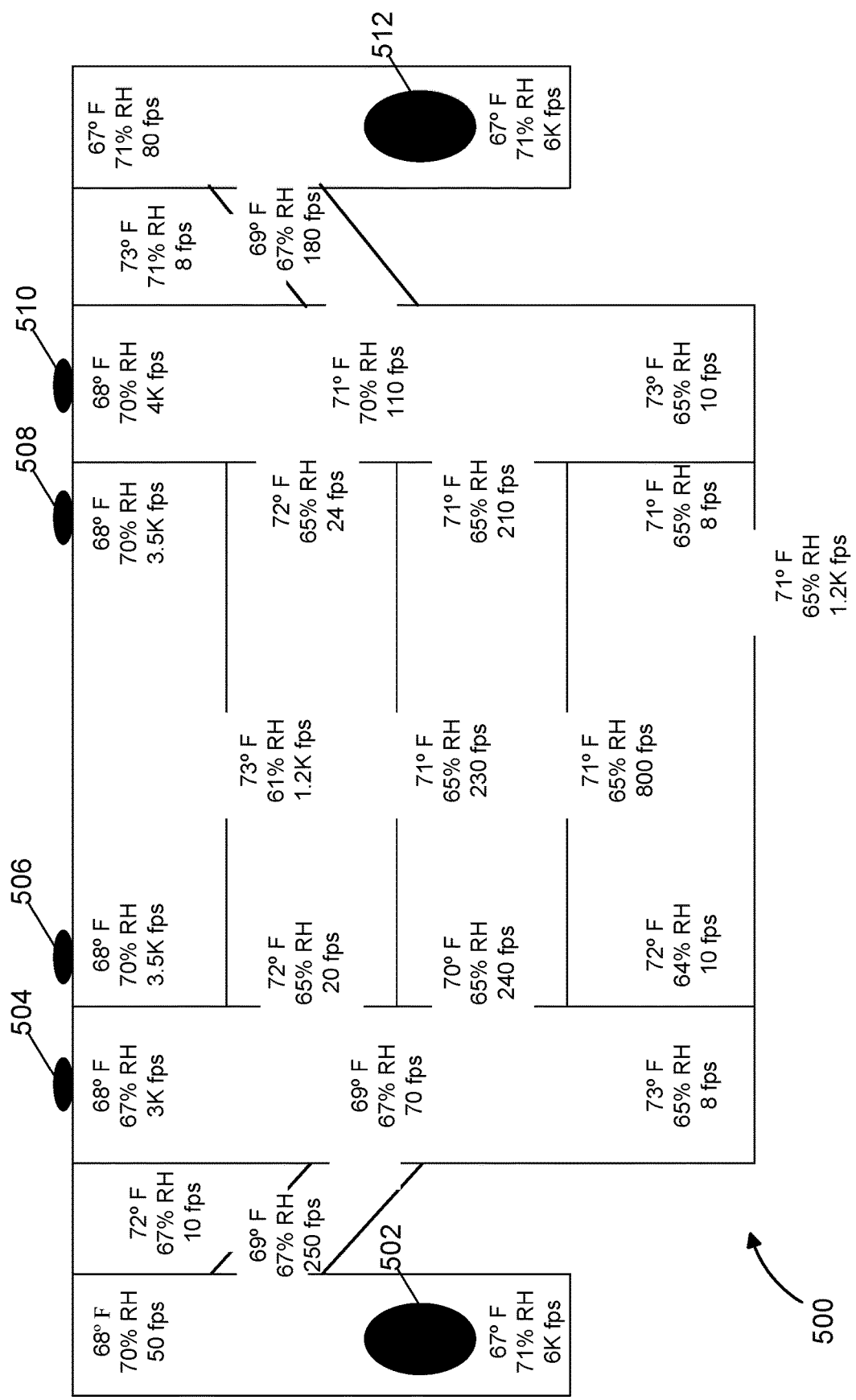
FIG. 5 provides actual environmental data captured throughout various locations within a fuel tank.

With reference now to FIG. 5, actual data (temperature, RH, and air velocity) acquired from a BMSS-45 fuel tank (fuel tank 500) using conventional systems/methods is provided (see, for example, the system shown in FIG. 1). As shown in FIG. 5, the air entering fuel tank 500 adjacent to vent 502 is 67° F., has an RH of 71% and has a velocity of 6K fps; the air entering fuel tank 500 adjacent to vent 504 is 68° F., has an RH of 67% and has a velocity of 3K fps; the air entering fuel tank 500 adjacent to vent 506 is 70° F., has an RH of 70% and has a velocity of 3.5K fps; the air entering fuel tank 500 adjacent to vent 508 is 68° F., has an RH of 70% and has a velocity of 3.5K fps; the air entering fuel tank 500 adjacent to vent 510 is 68° F., has an RH of 70% and has a velocity of 4K fps; and the air entering fuel tank 500 adjacent to vent 512 is 67° F., has an RH of 71% and has a velocity of 6K fps. FIG. 5 also provides environmental data that was acquired at other locations throughout fuel tank 500. However, as shown in FIG. 5, using conventional systems/methods, the temperature, RH, and velocity of the air flowing through fuel tank 500 is very inconsistent, with temperatures ranging from 67° F. to 73° F., RH levels ranging from 61% RH to 71% RH, and air velocity ranging from 8 fps to 6K fps.

Figure 6:
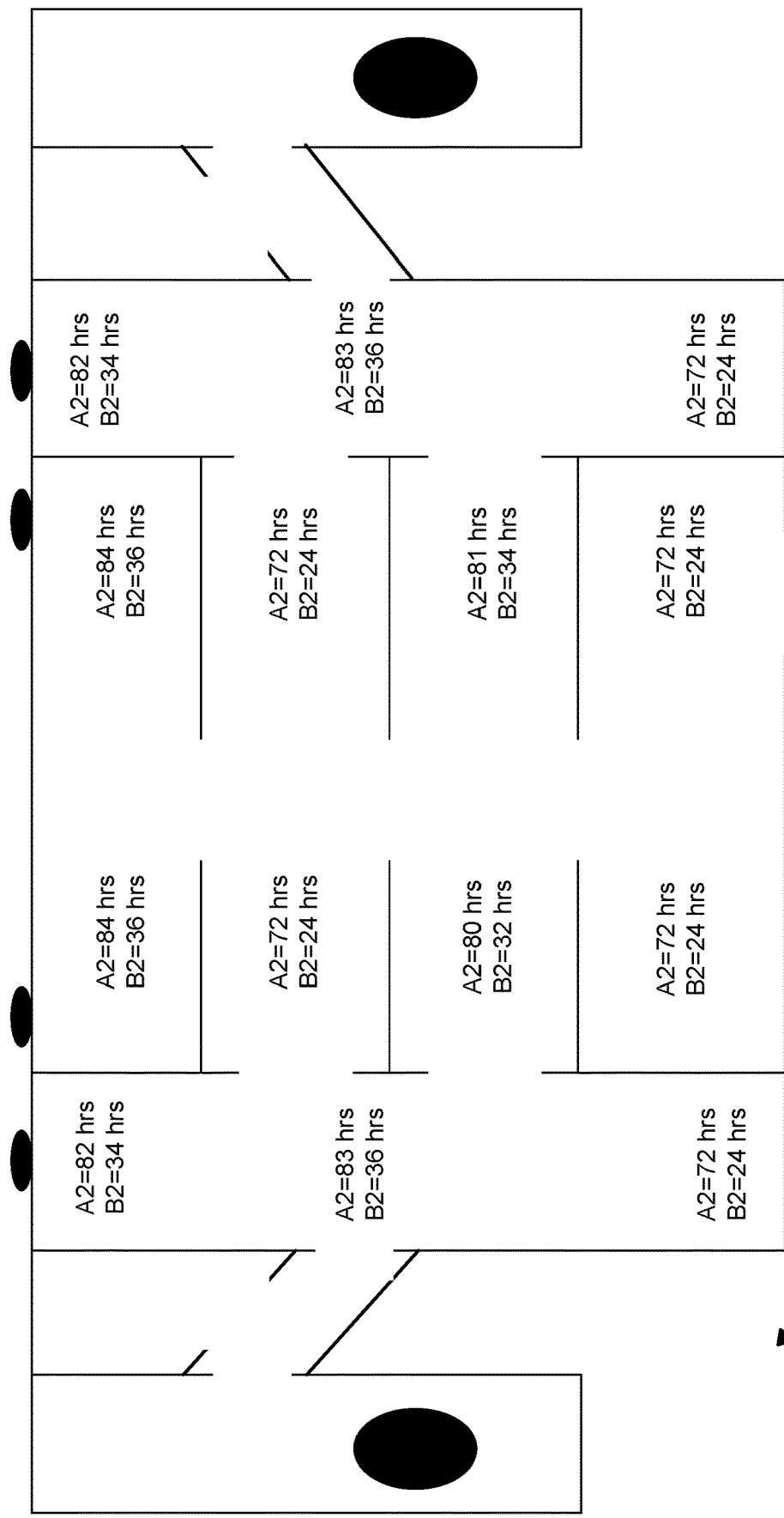
FIG. 6 illustrates actual curing times of sealants throughout various locations within a fuel tank based on the data shown in FIG. 5.

FIG. 6 provides actual cure times of a Class A2 sealant and a Class B2 sealant applied within fuel tank 500 under the conditions provided in FIG. 5. In the exemplary data provided, a Class A2 sealant is expected to cure within 72 hours if the environment is at 77° F. with 50% RH. Further, a Class B2 sealant is expected to cure within 24 hours if the environment is at 77° F. with 50% RH. However, as a result of the varying temperatures and RH levels throughout fuel tank 500 (as shown in FIG. 5), the amount of time it takes the Class A2 sealant and the Class B2 sealant to cure varies by 12 hours, respectively, throughout fuel tank 500.

Figure 7:
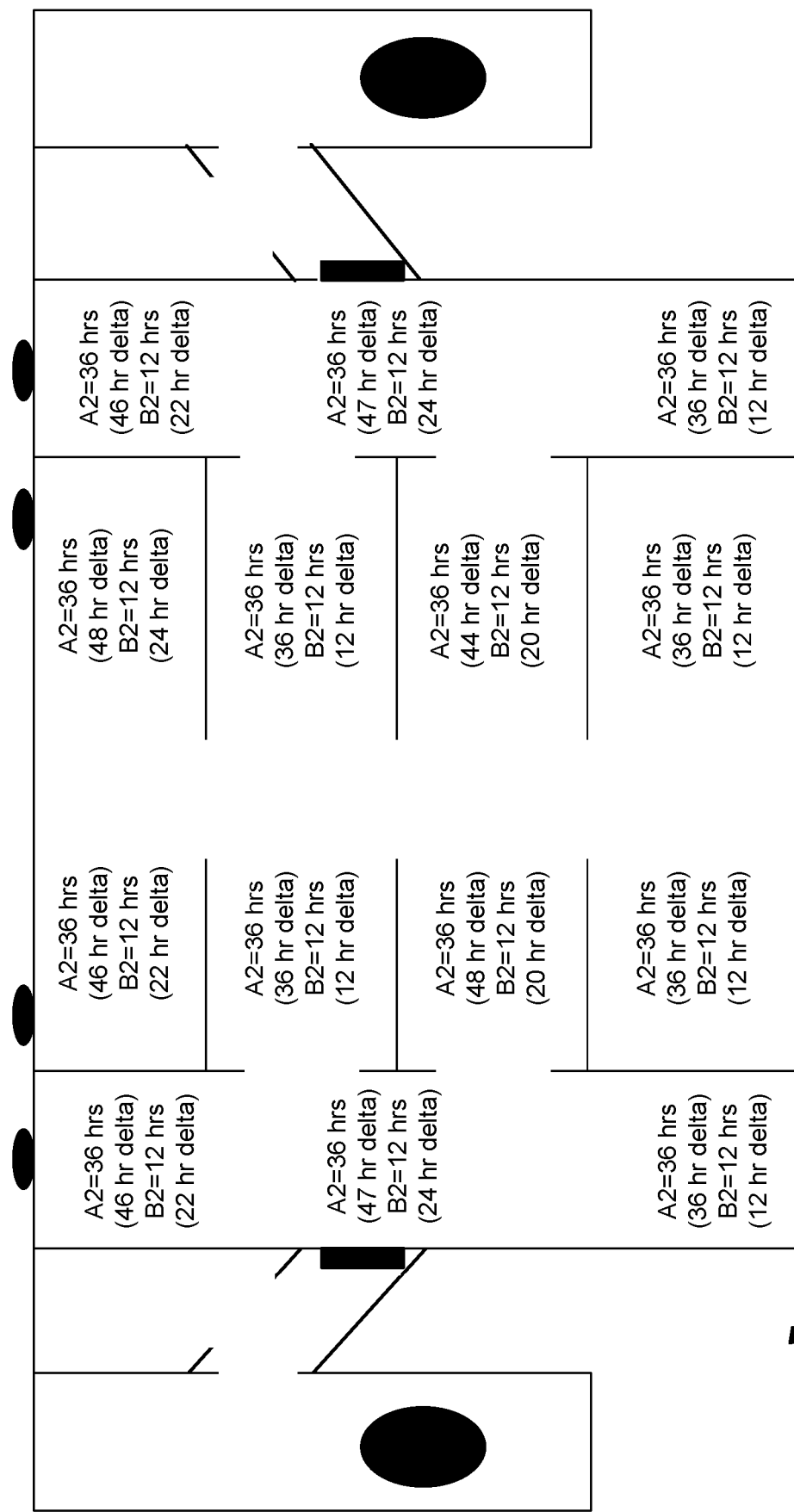
FIG. 7 illustrates calculated curing times of sealants throughout various locations within a fuel tank based on embodiments of the present disclosure.

With reference now to FIG. 7, cure times of the Class A2 sealant and the Class B2 sealant utilizing embodiments of the present disclosure, for example, the system shown in FIG. 4, are provided. The cure times shown in FIG. 7 are based on an airflow temperature of 140° F. with 60% RH provided throughout fuel tank 500 using a plurality of conduits (e.g., conduit 410) and vents 408, shown in FIG. 4. As shown in FIG. 7, the cure times for the Class A2 sealant and the Class B2 sealant are consistent throughout fuel tank 500 (e.g., 36 hours for Class A2 sealant and 12 hours for Class B2 sealant). Furthermore, FIG. 7 also illustrates the change/delta of time for curing the Class A2 sealant and the Class B2 sealant at various locations throughout fuel tank 500 when compared to the cure times shown in FIG. 6 using conventional systems/methods. For example, as shown in FIG. 7, the cure times for the Class A2 sealant and the Class B2 sealant have been reduced by 50% to almost 60% utilizing the systems and methods of the present disclosure, when compared to the cure times of the Class A2 sealant and the Class B2 sealant utilizing conventional systems and methods, for example, shown in FIGS. 1, 5, and 6.

The examples used herein are illustrative only, and are not meant to be limited to the elements of those examples. The above-described embodiments provide efficient systems and methods for enabling controlled air flow, providing predictable sealant cure times, eliminating VOC pooling, reducing perceived temperatures, and/or managing hot/cold spots during an assembly of a fuel tank. However, the systems and methods described herein are not limited to the specific embodiments described herein, but rather, components of the system and/or steps of the methods may be utilized independently and separately from other components and/or steps described herein. For example, the system may also be used in combination with other systems and methods, and is not limited to practice with only fuel tanks and methods as described herein. Rather, the exemplary embodiment can be implemented and utilized in connection with many other assembly/sealant/ventilation applications or anywhere a need exists to control environment by adjusting/monitoring one or more of temperature, RH, and airflow.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for controlling an environment within a volume, the volume comprising an inlet and at least one bay, the system comprising:
   a conduit comprising:
   a distal end, a proximal end, and a length extending between the distal end and the proximal end, the length of the conduit configured to be placed within the at least one bay via the inlet; and
   a plurality of vents distributed about the length, the conduit defining a path along which a flow of air moves from the proximal end toward the distal end and out the plurality of vents to deliver the flow of air throughout the at least one bay.

2. The system of claim 1, further comprising:
   at least one sensor configured to measure at least one of temperature and relative humidity within the volume; and
   a controller comprising a processor, the processor programmed to receive, from the at least one sensor, a current measure of the at least one of the temperature and the relative humidity within the volume.

3. The system of claim 2, wherein the processor is further programmed to:
   receive a user-selected time duration over which a sealant applied within the volume is to cure; and
   control a temperature of the flow of air and a humidity within the flow of air to achieve the user-selected time duration to cure the sealant.

4. The system of claim 2, wherein the at least one sensor comprises a sensor configured to measure a level of volatile organic compounds within the volume, and wherein the processor is further programmed to increase a velocity of the flow of air when the level of the volatile organic compounds exceeds a threshold level.

5. The system of claim 2, wherein the processor is further programmed to adjust a velocity of the flow of air based on an identified time and/or a rate at which air within the volume is being pulled out of the volume through one or more vents on an exterior wall of the volume.

6. The system of claim 2, wherein the processor is further programmed to:
   count a number of humans within the volume; and
   increase a velocity of the flow of air and/or decrease the temperature of the flow of air based on the number of humans within the volume to enable the temperature to be at or below a safe temperature threshold.

7. The system of claim 2, wherein the processor is further programmed to:
   determine that a human is not within the volume;
   increase the temperature within the volume to a maximum temperature threshold; and
   increase the relative humidity within the volume to a maximum relative humidity threshold.

8. The system of claim 2, wherein the processor is further programmed to:
   receive historic volume environment data, the historic volume environment data comprising temperature and relative humidity data from defined locations within a plurality of volumes; and
   define the path of the conduit based on the historic volume environment data.

9. The system of claim 8, wherein the processor is further programmed to determine positions along the conduit for each of the plurality of vents based on the historic volume environment data and a location of a sealant within the volume.

10. A method for controlling an environment within a volume, the volume comprising an inlet and at least one bay, the method comprising:
    placing a length of a conduit within the at least one bay of the volume via the inlet, the length extending between a proximal end and a distal end, the conduit defining a path, from the proximal end to the distal end;
    receiving a current measure of at least one of a temperature and a relative humidity within the volume; and
    adjusting, based on the current measure, one or more of a temperature of a flow of air and a humidity within the flow of air directed, from the proximal end and toward the distal end, through a plurality of vents distributed along the length of the conduit to deliver the flow of air throughout the at least one bay.

11. The method of claim 10, further comprising:
    receiving a user-selected time duration over which a sealant applied within the volume is to cure; and
    controlling a temperature of a flow of air and a humidity within the flow of air directed through a plurality of vents along a conduit that defines a path through the volume to achieve the user-selected time duration for the sealant to cure.

12. The method of claim 11, further comprising adjusting a velocity of the flow of air based on the user-selected time duration or a rate at which air within the volume is being pulled out of the volume through one or more vents on an exterior wall of the volume.

13. The method of claim 10, further comprising:
    receiving, from at least one sensor, a current level of volatile organic compounds within the volume; and
    increasing a velocity of the flow of air when the current level of the volatile organic compounds exceeds a threshold level.

14. The method of claim 10, further comprising:
    counting a number of humans within the volume; and
    increasing a velocity of the flow of air and/or decrease the temperature of the flow of air based on the number of humans within the volume to enable the temperature to be at or below a safe temperature threshold.

15. The method of claim 10, further comprising:
    receiving historic volume environment data, the historic volume environment data comprising temperature and relative humidity data from defined locations within a plurality of volumes; and
    defining the path of the conduit based on the historic volume environment data.

16. The method of claim 15, further comprising determining positions along the conduit for each of the plurality of vents based on the historic volume environment data and a location of a sealant within the volume.

17. The method of claim 10, further comprising:
    determining that a human is not within the volume;
    increasing the temperature within the volume to a maximum temperature threshold; and
    increasing the relative humidity within the volume to a maximum humidity threshold.

18. One or more non-transitory computer-readable media comprising instructions for controlling an environment within a volume, the volume comprising an inlet and at least one bay within which a length of a conduit is placed via the inlet, the conduit defining a path, from a proximal end to a distal end thereof, the instructions causing a processor to perform the steps of:
    receiving a current measure of at least one of a temperature and a relative humidity within the volume; and
    adjusting, based on the current measure, one or more of a temperature of a flow of air and a humidity within the flow of air directed, from the proximal end and toward the distal end, through a plurality of vents distributed along the length of the conduit to deliver the flow of air throughout the at least one bay.

19. The non-transitory computer-readable media of claim 18, wherein the instructions further cause the processor to perform the steps of:
    receiving a user-selected time duration over which a sealant applied within the volume is to cure; and
    controlling a temperature of a flow of air and a humidity within the flow of air directed through a plurality of vents along a conduit that defines a path through the volume to achieve the user-selected time duration for the sealant to cure.

20. The non-transitory computer-readable media of claim 18, wherein the instructions further cause the processor to perform the steps of:
    receiving, from at least one sensor, a current level of volatile organic compounds within the volume; and
    increasing a velocity of the flow of air when the current level of the volatile organic compounds exceeds a threshold level.

21. The non-transitory computer-readable media of claim 18, wherein the instructions further cause the processor to perform the steps of:
    counting a number of humans within the volume; and
    increasing a velocity of the flow of air and/or decrease the temperature of the flow of air based on the number of humans within the volume to enable the temperature to be at or below a safe temperature threshold.

22. The non-transitory computer-readable media of claim 18, wherein the instructions further cause the processor to perform the steps of:
- receiving historic volume environment data, the historic volume environment data comprising temperature and relative humidity data from defined locations within a plurality of volumes;
- defining the path of the conduit based on the historic volume environment data; and
- determining positions along the conduit for each of the plurality of vents based on the historic volume environment data and a location of a sealant within the volume.

23. The non-transitory computer-readable media of claim 18, wherein the instructions further cause the processor to perform the steps of:
- determining that a human is not within the volume;
- increasing the temperature within the volume to a maximum temperature threshold; and
- increasing the relative humidity within the volume to a maximum humidity threshold.

\* \* \* \* \*